No. 739,891. Patented September 29, 1903.

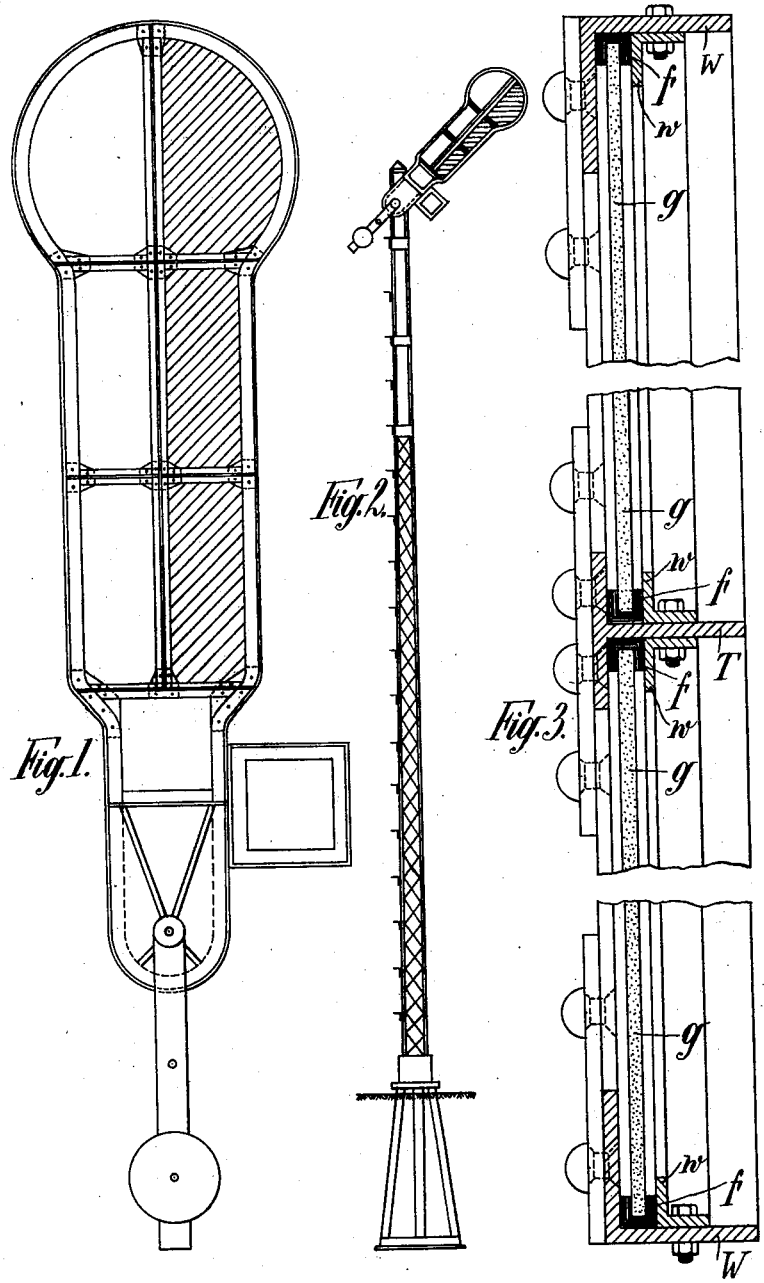

UNITED STATES PATENT OFFICE.

GOTTFRIED HEINRICH JACOB MAAS, OF ARNSBERG, GERMANY.

SEMAPHORE.

SPECIFICATION forming part of Letters Patent No. 739,891, dated September 29, 1903.

Application filed April 17, 1903. Serial No. 153,105. (No model.)

*To all whom it may concern:*

Be it known that I, GOTTFRIED HEINRICH JACOB MAAS, civil engineer, federal and architectural counselor, and a subject of the King of Prussia, Emperor of Germany, residing at 7 Rumbeckerstrasse, in the city of Arnsberg, Province of Westphalia, Kingdom of Prussia, German Empire, have invented a certain new and useful Semaphore, of which the following is a specification.

The semaphores as heretofore constructed of perforated grate-like or solid sheet-iron plates and which are usually painted half white and half red are not always distinctly visible, even if the painting is carefully preserved. If the arm of the semaphore is placed between the source of light and the observer—that is to say, the engine-driver or the attendant at the station—the side which is directed toward the latter is not lighted, and it is therefore difficult to distinguish it, particularly on a dark background—as, for instance, presented by a hill covered with trees in autumnal colors or presented by a dark agglomeration of clouds. If the observer is placed between the sun or the particular light-emitting region of the sky where the sun happens to be and between the arm of the semaphore, the said arm so lighted comes out from the lighted background with less distinctness than is required. In order to avoid these difficulties, the faces of the wings of the semaphore have been filled with glass instead of with sheet-iron or with several strips of sheet-iron, so-called "milk-glass" being used with preference, which for the most part consists of ordinary transparent glass covered with a thin layer of milk-glass on one side only. While solid plates of milk-glass of greater thickness or porcelain are only exhibiting a slight degree of transparency, the above-mentioned covered glass shows the peculiarity not only to allow large quantities of the rays of light to pass unimpeded, but also to reflect part of the same from the surfaces of the layer of milk-glass. Hence the glass surface becomes visible by reflected light to the observer if the light is at his rear and by means of the light passing therethrough if the light is at the opposite side of the observer on the other side of the wing of the semaphore. Such semaphores as heretofore constructed, which are always white, fail to work when the background is white also—that is to say, if the sky is, for instance, covered with white clouds or in the case of a mountain landscape having assumed its hibernal covering. For such cases the improved semaphore or signal wing, which is shown on the accompanying drawings in Figures 1 and 2 in elevation and in cross-section in Fig. 3 and the surface of which is composed of white or red glass, affords a successful solution of the problem. The red glass also consists, chiefly, of ordinary transparent glass covered with a thin layer only of colored glass. Glasses which are colored red throughout are not obtainable at all in such thickness as is required for practical purposes. Surface-colored red glass shows the property to color the impinging rays of light red for the eye of the observer, the rays being partly allowed to pass and partly reflected. By the combination of both glass surfaces in one semaphore-wing, which in this case is to be made somewhat broader than usual, the observer when the light is placed at his rear is enabled to distinctly view the signal-wings by means of the reflected rays—that is to say, the white-glass surface upon a dark background and the red surface upon a light background—while, on the other hand, if the light is opposite to the observer—that is to say, behind the semaphore-wing—the said glass surfaces become visible in the same manner upon a light and a dark background, respectively, but by the action of the rays, which are allowed to pass through the glass.

As regards the visibility due to reflected rays there is a possibility of a bundle of rays of light showing equal values of their angle of entrance and emission of light and parallely directed by suitable means entering the eye of the observer in certain positions of the same instead of dispersed reflected rays, such parallel rays producing upon the glass surfaces white reflexes, which do not contrast sufficiently upon the white background. This difficulty is overcome by providing the above-mentioned glasses at their outside with slight etching, whereby the reflex lights are made to disappear entirely. When superficially-coated milk-glass is used, which, as above explained, should appear white upon a dark background, it is in most cases not necessary to remove the reflexes, inasmuch as these reflexes are white in themselves. Still if for some exceptional purpose this is desired the glass may be slightly etched on both sides, whereby the transparency of the surface-coated, milk-glass though somewhat impaired, remains considerably larger yet than if milk-glass of the same thickness, which is colored white throughout and etched on both sides, is used for removing the reflexes. The visibility due to reflected rays is thereby correspondingly increased. In the case of glass with red surface coating only the coated side should be etched, inasmuch as if the side which shows the ordinary window-glass is treated in the same manner this surface would become white and would cease to reflect any red rays. Even on the coated side the etching has to be done very carefully, so that the thin red-glass coating is not worn through, but retains its capability of reflecting red rays. In case existing conditions should require to exclude the possibility of the projection of reflexes on both sides of the red glass two red-glass panes should be so placed upon each other that the slightly-etched red-coated surfaces are at the outside, while the sides which are not etched and show ordinary window-glass are touching each other. If the etching is done carefully, so as to absolutely avoid the wearing out of the red-glass coating, the glass plates reflect red-colored rays very well, and they also allow them to pass unimpeded. Both kinds of rays are colored somewhat darker red. In consequence thereof the surfaces will show very clearly for every kind of light upon the white background, for which this part of the semaphore-arm is intended.

On the accompanying drawings I have illustrated the construction of a signal or semaphore arm showing two colored plates, as above described.

In the drawings, W is the large angle-iron for the frame of the wing.

T indicates the partitions or dividing grate-bars between the plates of milk-glass and red glass and between the several panes of the same kind.

$g\ g$ are the glass plates.

$f\ f$ are overlapping edges of felt or rubber.

$w\ w$ are the small angle-irons used for fastening purposes and by the removal of which a broken pane may be easily interchanged.

When darkness sets in, the glass arms lose their visibility the same as ordinary signal-arms of sheet-iron, and they are then replaced by signal-lights with artificial illumination. The signal may be made of single glass panes or double glass panes—that is, one pane being put upon another of the same color.

What I claim as my invention, and desire to secure by Letters Patent, is—

A signal or semaphore arm with glass panes which are visible upon any kind of background, both with a light placed in front or at the rear of the observer and comprising a frame containing separate sections each of which is visible from a distance and which sections are filled with different-colored transparent glass panes placed at the side of one another, substantially as described.

In witness whereof I have hereunto signed my name in the presence of two subscribing witnesses.

GOTTFRIED HEINRICH JACOB MAAS.

Witnesses:
OTTO KÖNIG,
JOSEPH LANGE.